US006595530B2

(12) United States Patent
Wood

(10) Patent No.: US 6,595,530 B2

(45) Date of Patent: Jul. 22, 2003

(54) MEDICAL WALKER

(75) Inventor: Lacy D. Wood, Gaffney, SC (US)

(73) Assignee: American Healthcare Solutions, Inc., Gaffney, SC (US)

(*) Notice: Subject to any disclaimer, the term of this patent is extended or adjusted under 35 U.S.C. 154(b) by 0 days.

(21) Appl. No.: 09/821,575

(22) Filed: Mar. 29, 2001

(65) Prior Publication Data

US 2002/0140196 A1 Oct. 3, 2002

(51) Int. Cl.[7] ............................ B62B 7/04; B62B 3/02; B62M 1/12

(52) U.S. Cl. ........................ 280/42; 280/87.05; 280/650

(58) Field of Search ......................... 280/87.05, 87.051, 280/87.021, 87.041, 250.01, 650, 47.34, 47.38, 649, 647, 648; 297/5; 135/67

(56) References Cited

U.S. PATENT DOCUMENTS

| | | | | | |
|---|---|---|---|---|---|
| 1,448,783 | A | * | 3/1923 | Blewitt et al. | 297/6 |
| 1,890,396 | A | * | 12/1932 | Maphet | 297/6 |
| 2,374,182 | A | | 4/1945 | Duke | 155/22 |
| 2,733,754 | A | * | 2/1956 | Leslie | 297/5 |
| 3,256,035 | A | | 6/1966 | Garringer | 297/6 |
| 3,872,945 | A | * | 3/1975 | Hickman et al. | 180/65.6 |
| 3,993,349 | A | * | 11/1976 | Neufeld et al. | 297/6 |
| 4,046,374 | A | * | 9/1977 | Breyley | 482/68 |
| 4,212,493 | A | | 7/1980 | Ledesky | 297/6 |
| 4,253,678 | A | * | 3/1981 | Leclerc | 280/42 |
| 4,277,100 | A | * | 7/1981 | Beougher | 297/5 |
| 4,342,465 | A | * | 8/1982 | Stillings | 280/87.051 |
| 4,345,790 | A | * | 8/1982 | Coe | 297/6 |
| 4,384,713 | A | * | 5/1983 | Deutsch et al. | 482/68 |
| 4,532,948 | A | * | 8/1985 | Burrows | 135/67 |
| 4,621,804 | A | * | 11/1986 | Mueller | 280/87.041 |
| 4,770,410 | A | * | 9/1988 | Brown | 482/68 |
| 4,941,497 | A | * | 7/1990 | Prather et al. | 135/67 |
| 4,953,851 | A | * | 9/1990 | Sherlock et al. | 482/66 |
| 4,974,620 | A | * | 12/1990 | Quillan et al. | 135/67 |
| 5,133,377 | A | * | 7/1992 | Truxillo | 135/67 |
| 5,148,559 | A | * | 9/1992 | Morris | 5/86.1 |
| 5,163,188 | A | * | 11/1992 | Munroe | 5/81.1 R |
| 5,320,122 | A | | 6/1994 | Jacobson, II et al. | 135/66 |
| 5,353,824 | A | * | 10/1994 | Woods et al. | 135/66 |
| 5,380,262 | A | * | 1/1995 | Austin | 482/68 |
| 5,443,304 | A | * | 8/1995 | Fochs | 297/467 |
| 5,526,893 | A | * | 6/1996 | Higer | 180/65.1 |
| 5,538,268 | A | * | 7/1996 | Miller | 280/87.05 |
| 5,605,169 | A | * | 2/1997 | Light | 135/66 |
| 5,741,020 | A | * | 4/1998 | Harroun | 280/42 |
| 5,882,067 | A | * | 3/1999 | Carbajal et al. | 297/6 |
| 6,068,273 | A | * | 5/2000 | Rao et al. | 280/87.041 |
| 6,286,154 | B1 | * | 9/2001 | Pitts et al. | 4/480 |

* cited by examiner

*Primary Examiner*—Brian L. Johnson
*Assistant Examiner*—Bridget Avery
(74) *Attorney, Agent, or Firm*—McNair Law Firm, P.A.

(57) ABSTRACT

A walker having a pair of front vertical posts and rear vertical posts carrying vertically adjustable casters at the lower ends. A pair of front cross bars interconnect with the pair of front posts. A pair of first horizontal side bars interconnecting the front and rear vertical posts in spaced positions, and a pair of second horizontal side bars interconnecting second of the front and rear vertical posts, forming an enclosed area. A gate is pivotally connected to a rear post having a pair of horizontally spaced vertical rods interconnected at upper and lower extremities with a pair of vertically spaced horizontal rods forming a generally rectangularly configured gate. The gate has a pivotally connected seat assembly. The seat is operative between a horizontal position allowing the patient to sit and a vertical stored position.

16 Claims, 5 Drawing Sheets

Fig. 2
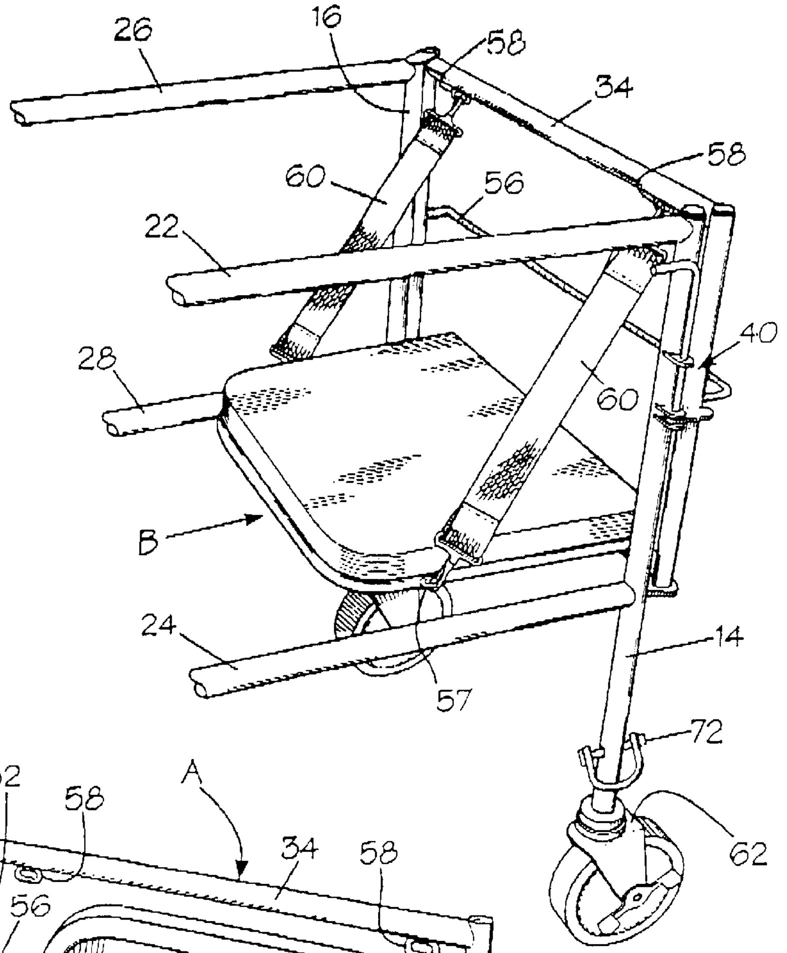
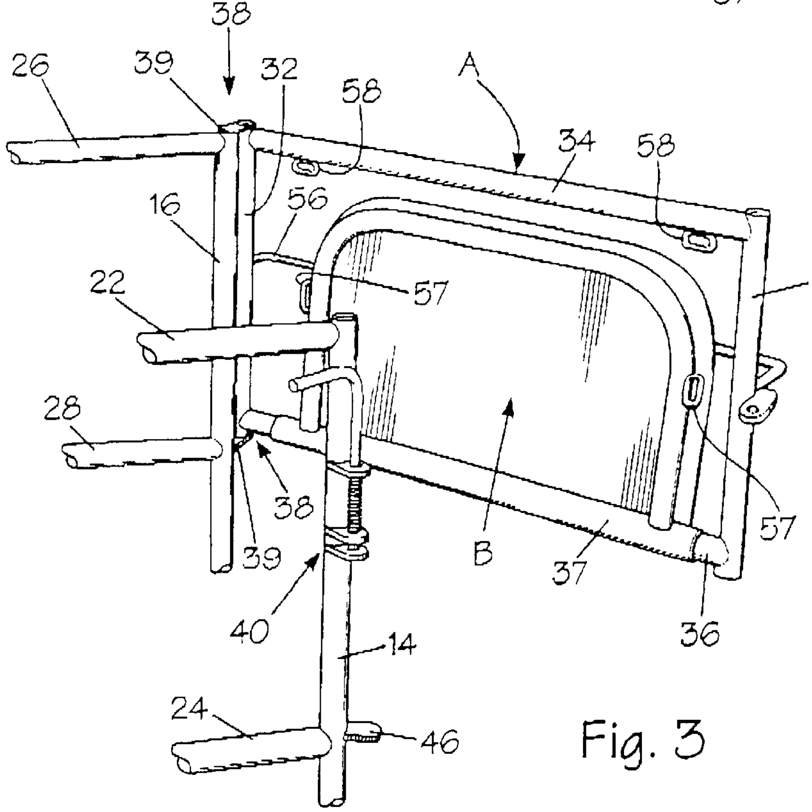
Fig. 3

MEDICAL WALKER

BACKGROUND OF THE INVENTION

This invention is directed to a support device commonly known as a walker. More specifically, this invention relates to an improved walker having an integrated seat assembly that allows a user to sit without leaving the support of the walker.

Various invalid walkers with integrated seats have been disclosed in several U.S. patents, including U.S. Pat. Nos. 4,212,493; 2,374,182; 3,256,035 and 5,320,122. However, many of these walkers are overly burdensome and complicated for the patients who use them. On many invalid walkers, the integrated seat can become a substantial obstacle to standing in the walker, or otherwise moving with the walker. Others are unnecessarily heavy with inappropriate proportions for the placed that a crippled patient must access while still using the support of the walker. Furthermore, none of these invalid walkers are capable of being sterilized for use with multiple patients. Given the expense of today's walkers, there is a need for a reusable invalid walker and, thus, room for improvement in the art.

The present invention, made from stainless steel, is capable of being sterilized for use with multiple patients. The present invention is also designed to allow the patients to go to the restroom and maneuver the walker over the toilet without leaving the support of the walker. The integrated seat is designed to fold completely out of the way, giving the patient greater freedom of movement in the walker and easier ingress and egress from the walker.

Accordingly, an object of the present invention is to provide an invalid patient walker made of stainless steel that can be resterilized for use with multiple patients.

Another object of the present invention is to provide an invalid patient walker with sufficient dimensions so as to encircle a toilet without the patient having to leave the support of the walker.

Still another object of the present invention is to provide an invalid patient walker with a rear entry gate carrying a built in foldaway seat that allows for easy ingress and egress of the walker.

Still another object of the present invention is to provide an invalid patient walker with a built in foldaway seat that allows a patient to sit when desired or fold the seat out of the way when walking.

Still another object of the present invention is to provide an invalid patient walker with a hanging seat that allows a patient to be supported in a seated position and still allowing the patient to move using the walker.

SUMMARY OF THE INVENTION

The above objectives are accomplished according to the present invention by providing an invalid patient walker having a spaced pair of front vertical posts, a spaced pair of rear vertical posts carrying vertically adjustable casters at the lower ends thereof. A pair of horizontal front cross bars interconnect with the pair of front posts in spaced positions. A pair of first horizontal side bars interconnect first of the front and rear vertical posts in spaced positions, and a pair of second horizontal side bars interconnect second of the front and rear vertical posts in spaced positions, forming an enclosed area between the front vertical post and the first front and rear vertical posts the second front and rear vertical posts.

A gate, connected with a first of the pair of rear posts, comprising a pair of horizontally spaced vertical rods interconnected at upper and lower extremities with a pair of vertically spaced horizontal rods forming a generally rectangularly configured structure.

The gate is attached by a hinge assembly connecting a first of the vertical rods with the first of the pair of rear post allowing pivotal movement of the gate between opened and closed positions. The gate also includes a latch assembly for connecting and disconnecting with the second of the pair of rear post.

The gate also includes a seat assembly pivotally connected with a lower of the pair of vertically spaced rods. The seat assembly is operative to maintain the seat in a horizontal operative position in which the patient may be in a seated position and a vertical stored position clearing the enclosed are for the patient to function in a standing position.

The latch assembly further includes vertically spaced first and second shelves extending from the second rear post and a finger extending from the second vertical rod, the finger being adapted to overlie the first shelf and a lower end of the second vertical rod being adapted to overlie the second shelf providing vertical support for the gate in the closed position.

The latch assembly further includes a plunger adapted to pass through aligned openings in the first shelf and the finger locking the gate in the closed position. A third shelf is arranged over the first shelf with the third shelf overlying the finger with the gate in the closed position and the plunger passing through the third shelf.

The gate includes a stop bar between the upper and lower horizontal rods located laterally of the vertical and horizontal axis of the vertical and horizontal rods. The stop bar being operative to support and maintain the seat in a vertical position.

A pair of rings is carried by an upper of the horizontal rods for engaging a pair of flexible straps. A pair of flexible straps connected with the seat are adapted to connect with respective of the rings for maintaining the seat in the horizontal position.

A pair of rings is carried by an upper of the pair of horizontal front cross bars and a pair of rings carried by an upper of the horizontal rods for engaging flexible straps. Flexible straps connected with a hanging seat are adapted to connect with respective of the rings for maintaining the hanging seat between the front cross bars and the horizontal rods.

The pair of front vertical posts, pair of rear vertical posts, pair of horizontal front cross bars and first and second horizontal side bars are spaced apart a sufficient distance to allow the walker to encircle a toilet without the user having to leave the support of the walker.

The walker includes a vertical rod adapted for carrying bags of fluid.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein:

FIG. 2 shows a side perspective of the seat in the horizontal position;

FIG. 3 shows a side perspective of the rear gate in the open position;

DESCRIPTION OF A PREFERRED EMBODIMENT

Figure 1:
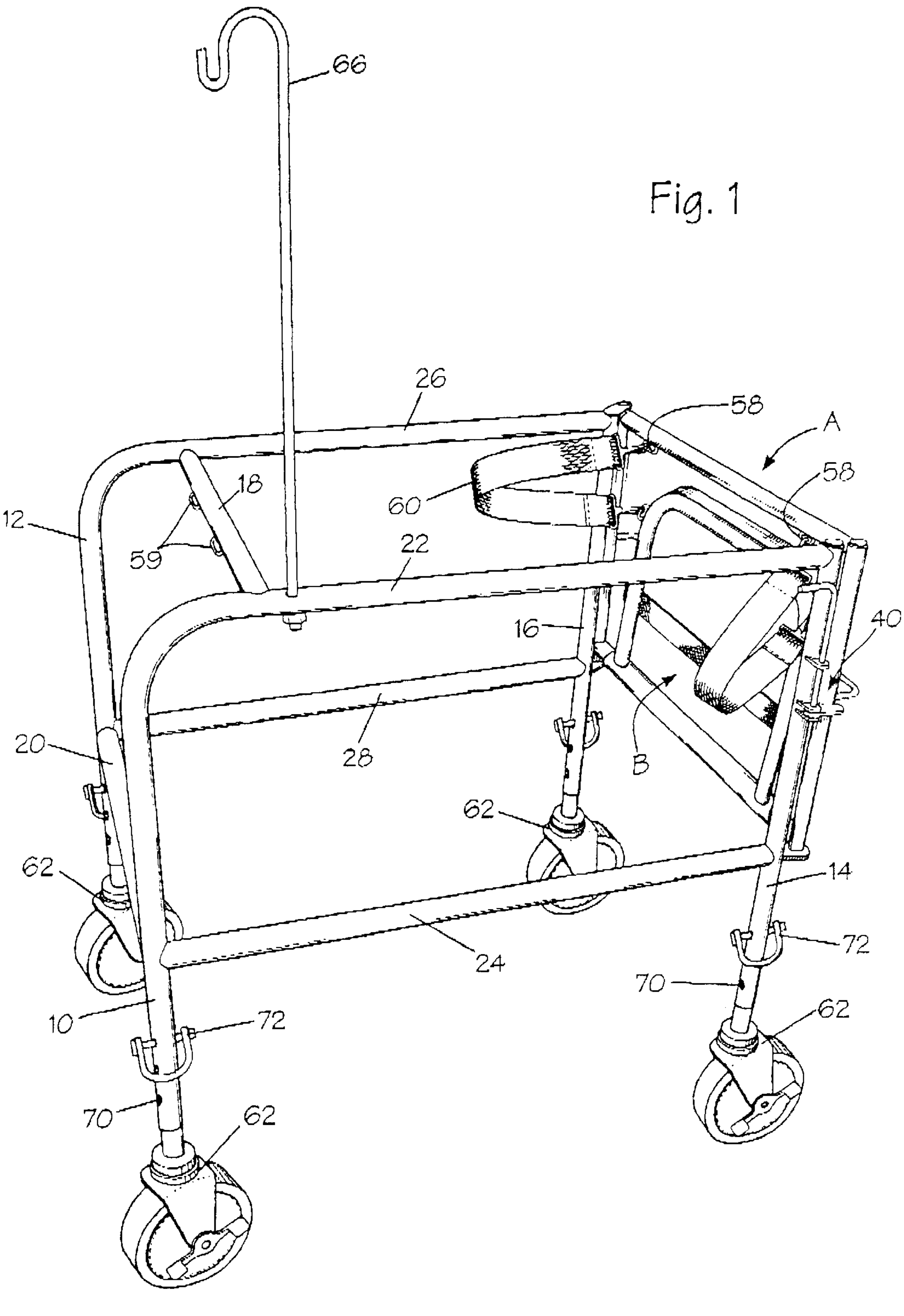
FIG. 1 shows a side perspective of the walker according to the invention.

Referring now in more detail to the drawings, the invention will now be described in more detail. As shown in FIG. 1, the walker is comprised of a horizontally spaced pair of front vertical posts 10, 12, and horizontally spaced pair of rear vertical posts 14, 16. These front vertical posts are interconnected with a pair of horizontal front cross bars 18, 20. The front vertical post and cross bars are interconnected with two sets of horizontal side bars. A pair of first horizontal side bars 22, 24 interconnects with the first of said front and rear vertical posts 10, 14 and a first end of the front cross bars. A pair of second horizontal side bars 26, 28 interconnects with the second of said front and rear vertical posts 12, 16 and the second end of the front cross bars. Once interconnected the bars and posts form an enclosed area of generally rectangular shape in which a patient may stand or sit to utilize the support of the walker. The posts are spaced a sufficient distance apart to form an enclosed area large enough to encircle a toilet without the user having to leave the walker. A preferred embodiment of the walker has the following dimensions: approximately 30" wide, 36" long, and 36" to 44" high. These dimensions may very as needed.

Figure 1A:
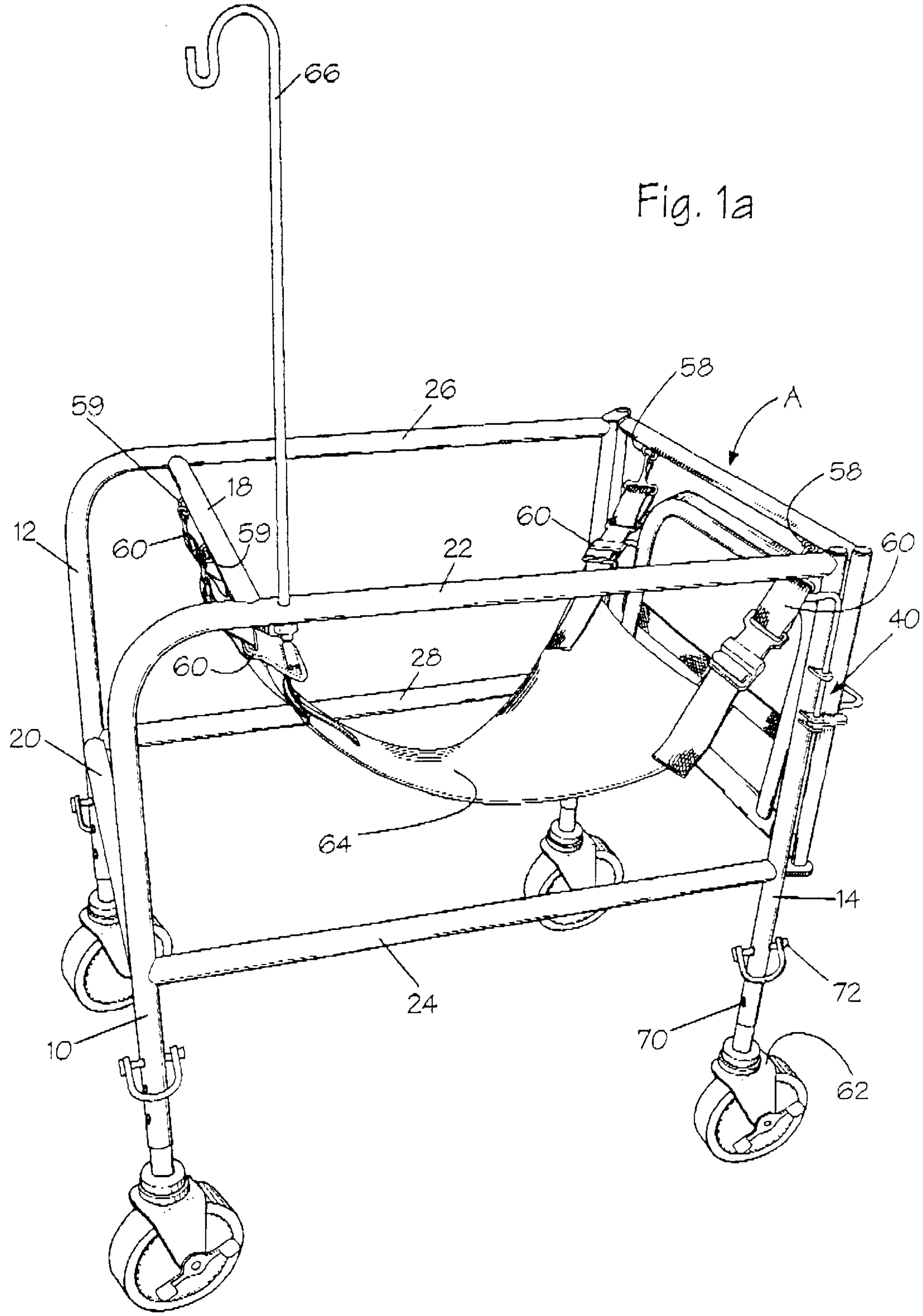
FIG. 1*a* is similar to FIG. 1 showing the walker with a sling attachment.

The lower ends of vertical posts 10, 12, 14, 16 are hollow with multiple sets of holes 70 drilled through the posts at equidistant intervals extending longitudinally along the axis, as shown in FIG. 1*a*. A caster assembly 62 is inserted into the hollowed out lower posts to provide wheels for ease of movement of the walker. The caster assembly includes a wheel carried by a bracket which mounts a post not seen but common to the art of casters. The caster wheels also include locking elements to keep the wheels stationary when desired. Such locking elements are also common to the art of casters. The post carried on the top of the bracket is inserted into the hollow end of the vertical posts. The attachment bar contains a sets of holes which align with holes 70 drilled through the vertical posts. A pin 72 may then be inserted through holes 70 which then passes thought the holes in the post of the caster assembly to secure the caster assembly in position. This allows the post to be telescoped to different lengths to adjust the height of the walker to better suit the size of the patient. In the preferred embodiment, the caster assembly is allowed to telescope approximately 8" to provide sufficient adjustment for various patients. This allows the upper horizontal side bars 22, 26 to range in height from 36" to 44".

Figure 4:
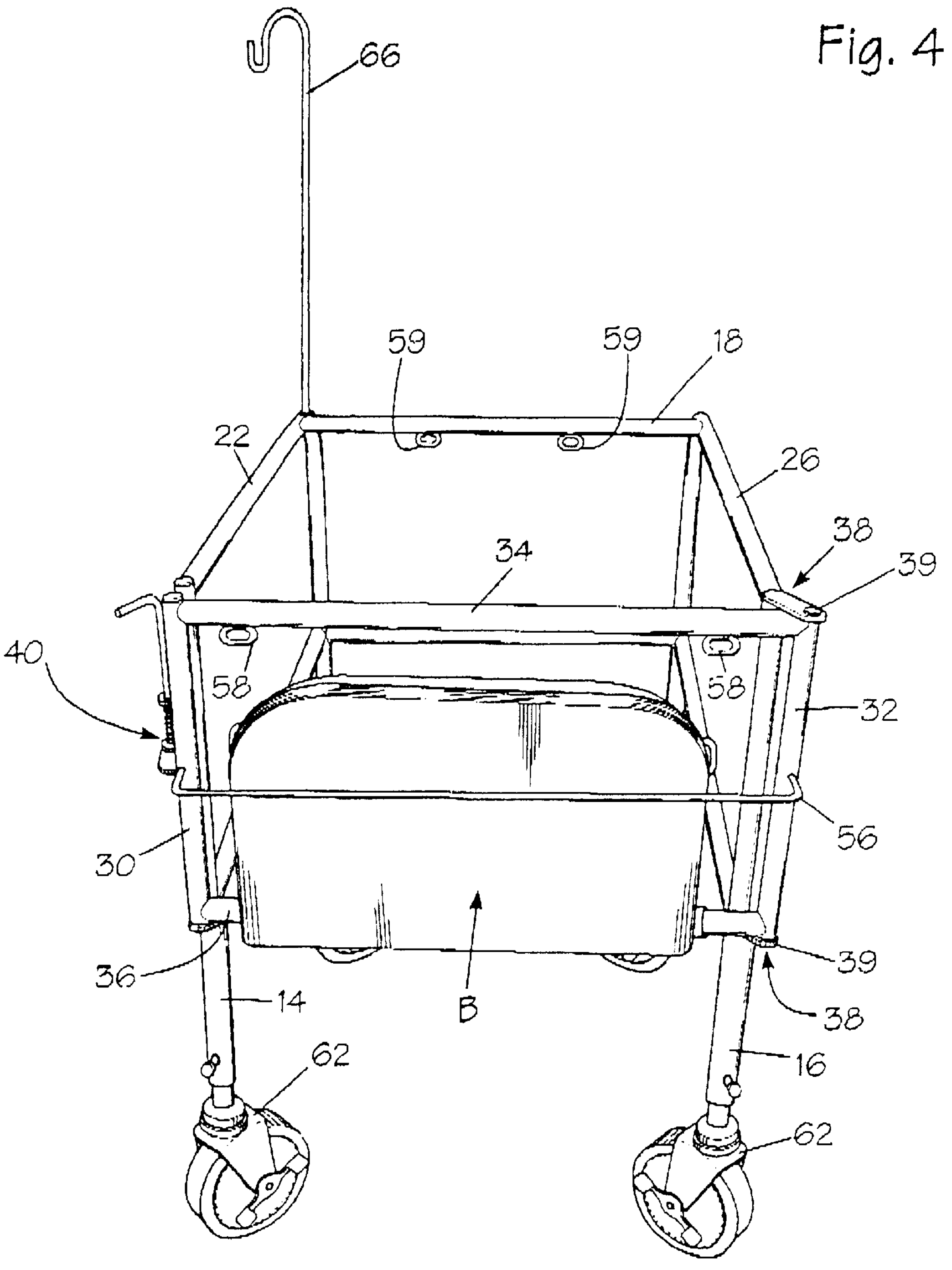
FIG. 4 shows a rear perspective of the walker with the gate in the closed position and the seat in the vertical position; and, FIG. 5 shows an exploded view of the latch assembly.

Referring now to FIGS. 2, 3, and 4, a gate A is pivotally connected with rear post 16 for allowing ingress and egress to the walker. The gate consists of a pair of horizontally spaced vertical rods 30, 32 interconnected at upper and lower extremities with a pair of vertically spaced horizontal rods 34, 36 forming a generally rectangularly shaped gate A. A hinge assembly 38 pivotally connects the upper and lower ends of vertical rod 32 to the rear vertical post 16 and allows pivotal movement of the gate between opened and closed positions. The hinge assembly includes upper and lower outwardly extending horizontal shelves 39 which are fixedly attached to rear post 16 and positioned at an acute angle to the longitudinal axis of bars 26, 28. The shelves carry a rod for engaging through rod 32. The hinge assembly allows the gate to fully open so that the longitudinal axis of rods 34, 36 are substantially parallel with the axis of bars 26, 28.

Referring to FIGS. 2, 3, 4, and 5, a seat assembly B is pivotally connected to the gate A on the lower horizontal rod 36 by way of a hollow tube 37. FIG. 2 illustrates the seat assembly in a horizontal operative position in which a patient may be in a seated position within the walker. The seat is maintained in this operative position by way of straps 60 connected to rings 57 and 58. Rings 57 are carried on each side of the seat with rings 58 carried on horizontal rod 34. When not in use, the seat may be positioned in a vertical stored position, as shown best in FIG. 5, clearing the enclosed area of the walker allowing a patient to function in a standing or walking position. The gate includes a stop bar 56 positioned between upper and lower horizontal rods 34, 36 and interconnected to vertical rods 30, 32. The stop bar is a generally narrow rounded bar that extends laterally rearwardly away from vertical rods 30, 32 at the connection point a sufficient distance to accommodating the thickness of the seat assembly which allows the seat assembly B to be pivoted slightly past vertical before contacting stop bar 56, thereby maintaining the seat in the relatively vertically stored position clear of the enclosed area of the walker.

Again, referring to FIGS. 1*a* and 4, the upper horizontal front cross bar 18 also carries a pair of rings 59 for engagement with straps 60. As illustrated in FIG. 1*a*, rings 58 and rings 59 can be used to engage with straps 60 to connect a hanging seat 64. This embodiment allows a patient to maintain a seated position while still being able to move the walker.

Figure 5:
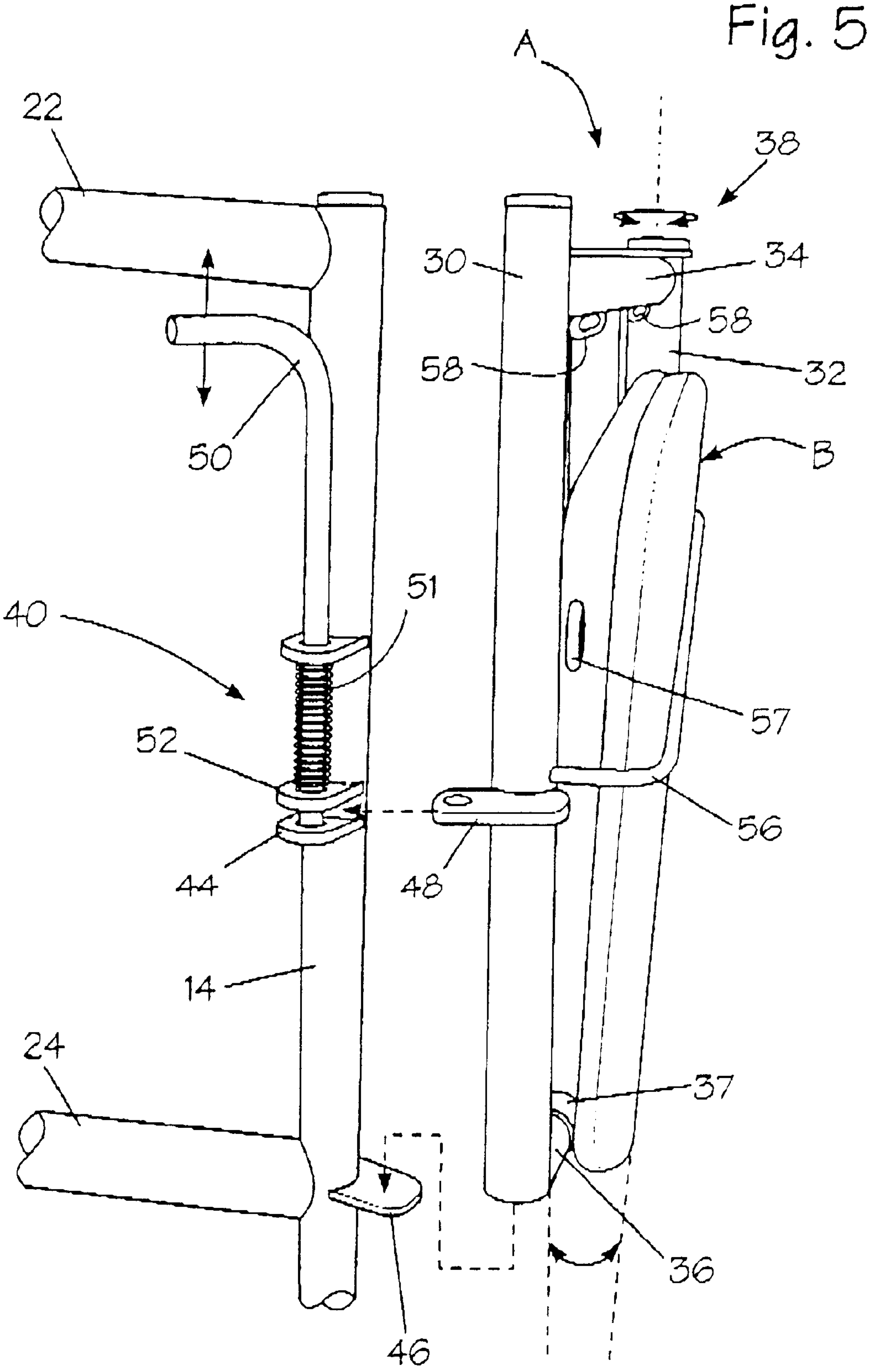

Referring now to FIGS. 3 and 5, a latch assembly 40 for securing the gate in the closed position and for providing horizontal and vertical support for gate A, enabling stability when the patient is seated in seat assembly B. The latch assembly is connected to rear vertical posts 14 and vertical rod 30 of the gate. The latch assembly includes a first shelf 44 vertically spaced from second shelf 46. Shelves 44 and 46 extend outwardly and generally perpendicularly from rear post 14 and provides vertical support for the gate in the closed position. Finger 48 extends outwardly and generally horizontally of rod 30 in a position between shelves 44 and 52 when the gate is in the closed position. The lower end of vertical rod 30 overlies a lower shelf 46 which and provides additional vertical support for the gate in the closed position. The latch assembly also includes a plunger 50 which passes through aligned openings in shelf 52, finger 48 and shelf 44 locking the gate in a closed position, and along with shelf 46 providing horizontal and vertical support for the gate. Spring 51 normally urges plunger 50 into its downward position.

The walker of the invention may be adapted to carry intravenous fluids when needed as illustrated by vertical rod 66. Also, a tray that must also be fitted over bar 18 allowing the patient to eat, read, work, or play games. The walker is also capable of carrying monitors needed by a patient. All of these functions have been provided for by known walkers, although not necessarily by a single walker.

While a preferred embodiment of the invention has been described using specific terms, such description is for illustrative purposes only, and it is to be understood that changes and variations may be made without departing from the spirit or scope of the following claims.

What is claimed is:

1. An invalid patient walker comprising:

a spaced pair of front vertical posts;

a spaced pair of rear vertical posts;

a pair of horizontal front cross bars interconnecting said pair of front posts in vertically spaced positions;

a pair of first horizontal side bars interconnecting first of said front and rear vertical posts in vertically spaced positions;

a pair of second horizontal side bars interconnecting second of said front and rear vertical posts in vertically spaced positions, forming an enclosed area between said front vertical post and said first front and rear vertical posts and said second front and rear vertical posts;

first ones of said pair of said first and second horizontal side bars and said front horizontal cross bars extending along a common first horizontal plane and second ones of said pair of said first and second horizontal side bars and said front horizontal cross bars extending along a common second horizontal plane;

a gate connected with a first of said pair of rear posts, said gate comprising a pair of horizontally spaced vertical rods interconnected at upper and lower extremities with an upper and a lower horizontal rod forming a generally rectangularly configured gate;

a hinge assembly connecting a first of said vertical rods with said first of said pair of rear post, said hinge assembly allowing pivotal movement of said gate between opened and closed positions;

a latch assembly for connecting and disconnecting a second of said vertical rods with said second of said pair of rear post, said latch allowing positioning of said gate between said open and closed positions;

said latch assembly including vertically spaced first and second shelves extending from said second rear post and a finger extending from said second vertical rod, said finger being adapted to overlie said first shelf and a lower end of said second vertical rod being adapted to overlie said second shelf providing vertical support for said gate in said closed position;

a seat assembly pivotally connected with said lower horizontal rod, said seat assembly being operative to maintain said seat in a horizontal operative position in which said patient may be in seated position and a vertical stored position clearing said enclosed area for said patient to function in a standing position.

2. The walker of claim 1 wherein said latch assembly includes a plunger adapted to pass through aligned openings in said first shelf and said finger locking said gate in said closed position.

3. The walker of claim 1 wherein said gate includes a stop bar between said upper an lower horizontal rods, said stop bar located laterally of the vertical and horizontal axis of said vertical and horizontal rods, said stop bar being operative to support and maintain said seat in said vertical position.

4. The walker of claim 1 including a pair of rings carried by an upper of said horizontal rods, a pair of flexible straps connected with said seat, said straps being adapted to connect with respective of said rings for maintaining said seat in said horizontal position.

5. The walker of claim 2 including a third shelf arranged over said first shelf, said third shelf overlying said finger with said gate in said closed position and said plunger passing through said third shelf.

6. An invalid patient walker comprising:

a spaced pair of front vertical posts with vertically adjustable casters on lower ends thereof;

a spaced pair of rear vertical posts with vertically adjustable casters on lower ends thereof;

a pair of horizontal front cross bars interconnecting said pair of front posts in spaced positions;

upper and lower first horizontal side bars interconnecting first of said front and rear vertical posts in spaced positions;

upper and lower second horizontal side bars interconnecting second of said front and rear vertical posts in spaced positions, forming an enclosed area between said front vertical post and said first front and rear vertical posts and said second front and rear vertical posts;

a gate carrying a seat connected with said pair of rear posts, said gate comprising a pair of horizontally spaced vertical rods interconnected at upper and lower extremities with an upper and a lower horizontal rod forming a generally rectangularly configured gate;

a hinge assembly connecting a first of said vertical rods with said first of said pair of rear post, said hinge assembly allowing pivotal movement of said gate between opened and closed positions;

a latch assembly for connecting and disconnecting a second of said vertical rods with said second of said pair of rear post, allowing positioning of said gate between said open and closed positions;

said latch assembly including vertically spaced first and second shelves connected with and extending in different directions from said second rear post and a finger extending from said second vertical rod, said finger being adapted to overlie said first shelf while a lower end of said second vertical rod overlies said second shelf providing vertical support for said gate in said closed position in which said upper and lower horizontal rods of said gate are along substantially the same horizontal planes as said upper and lower of said first and second side bars.

7. The walker of claim 6 wherein said latch assembly includes a plunger adapted to pass through aligned openings in said first shelf and said finger locking said gate in said closed position.

8. The walker of claim 6 including a pair of rings carried by an upper of said pair of horizontal front cross bars and a pair of rings carried by an upper of said horizontal rods, flexible straps connected with a hanging seat, said straps being adapted to connect with respective of said rings for maintaining said hanging seat between said front cross bars and said horizontal rods.

9. The walker of claim 6 wherein said enclosed area is of a width sufficient to allow the walker to encircle a toilet without the user having to leave said support area.

10. The walker of claim 6 including a vertical rod adapted for carrying bags of fluid.

11. The walker of claim 6 including a caster assembly carried by each of said vertical posts.

12. The walker of claim 6 including a hanging seat connected between said cross bars and said gate.

13. The walker of claim 7 including a third shelf arranged over said first shelf, said third shelf overlying said finger with said gate in said closed position and said plunger passing through said third shelf.

14. The walker of claim 11 wherein each said caster assembly is connected with each said vertical post by adjustable securing members allowing vertical adjustment.

15. The walker of claim 14 wherein said securing members include securing pins passing through said vertical post and caster assembly, securing said caster assembly in selected vertical positions.

16. An invalid patient walker comprising:

a spaced pair of front vertical posts with vertically adjustable casters on lower ends thereof;

a spaced pair of rear vertical posts with vertically adjustable casters on lower ends thereof;

a pair of horizontal front cross bars interconnecting said pair of front posts in spaced positions;

a pair of first horizontal side bars interconnecting first of said front and rear vertical posts in spaced positions;

a pair of second horizontal side bars interconnecting second of said front and rear vertical posts in spaced positions, forming an enclosed area between said front vertical post and said first front and rear vertical posts and said second front and rear vertical posts;

a gate carrying a seat connected with said pair of rear posts, said gate comprising a pair of horizontally spaced vertical rods interconnected at upper and lower extremities with a pair of vertically spaced horizontal rods forming a generally rectangularly configured gate;

a hinge assembly connecting a first of said vertical rods with a first of said pair of rear post, said hinge assembly allowing pivotal movement of said gate between opened and closed positions;

a latch assembly for connecting and disconnecting a second of said vertical rods with said second of said pair of rear post, allowing positioning of said gate between said open and closed positions;

said latch assembly including vertically spaced first and second shelves connected with and extending in different directions from said second rear post and a finger extending from said second vertical rod, said finger being adapted to overlie said first shelf while a lower end of said second vertical rod overlies said second shelf providing vertical support for said gate in said closed position, said latch assembly including a plunger adapted to pass through aligned openings in said first shelf and said finger locking said gate in said closed position.

* * * * *